US011521329B2

(12) United States Patent
He et al.

(10) Patent No.: US 11,521,329 B2
(45) Date of Patent: Dec. 6, 2022

(54) UPDATED POINT CLOUD REGISTRATION PIPELINE BASED ON ADMM ALGORITHM FOR AUTONOMOUS VEHICLES

(71) Applicant: Baidu USA LLC, Sunnyvale, CA (US)

(72) Inventors: Runxin He, Sunnyvale, CA (US); Shiyu Song, Sunnyvale, CA (US); Li Yu, Sunnyvale, CA (US); Wendong Ding, Sunnyvale, CA (US); Pengfei Yuan, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 446 days.

(21) Appl. No.: 16/692,956

(22) Filed: Nov. 22, 2019

(65) Prior Publication Data

US 2021/0158546 A1    May 27, 2021

(51) Int. Cl.
*G06T 7/33* (2017.01)
*G06T 7/73* (2017.01)
*G05D 1/00* (2006.01)
*G01S 19/45* (2010.01)
*G01S 17/89* (2020.01)

(52) U.S. Cl.
CPC ............... *G06T 7/33* (2017.01); *G01S 17/89* (2013.01); *G01S 19/45* (2013.01); *G05D 1/0088* (2013.01); *G06T 7/73* (2017.01); *G06T 2207/10028* (2013.01); *G06T 2207/20021* (2013.01); *G06T 2207/20072* (2013.01); *G06T 2207/20221* (2013.01); *G06T 2207/30252* (2013.01)

(58) Field of Classification Search
CPC ... G06T 7/33; G06T 7/73; G06T 2207/10028; G06T 2207/20021; G06T 2207/20072; G06T 2207/20221; G06T 2207/30252; G01S 17/89; G01S 19/45; G05D 1/0088
See application file for complete search history.

(56) References Cited

U.S. PATENT DOCUMENTS

| | | | |
|---|---|---|---|
| 9,760,996 B2* | 9/2017 | Chen | G01C 21/36 |
| 10,222,211 B2* | 3/2019 | Chen | G06T 7/248 |
| 10,976,421 B2* | 4/2021 | Zhang | G01S 7/51 |
| 11,073,601 B2* | 7/2021 | Nian | G01S 17/931 |
| 11,237,004 B2* | 2/2022 | Prasser | G06T 7/74 |
| 11,262,759 B2* | 3/2022 | Ren | G01S 17/894 |
| 11,288,412 B2* | 3/2022 | Golparvar-Fard | G06F 30/13 |
| 2020/0167954 A1* | 5/2020 | Wallin | G06V 10/454 |

* cited by examiner

*Primary Examiner* — Gregory M Desire
(74) *Attorney, Agent, or Firm* — Womble Bond Dickinson (US) LLP

(57) ABSTRACT

In one embodiment, a system and method for point cloud registration of LIDAR poses of an autonomous driving vehicle (ADV) is disclosed. The method selects poses of the point clouds that possess higher confidence level during the data capture phase as fixed anchor poses. The fixed anchor points are used to estimate and optimize the poses of non-anchor poses during point cloud registration. The method may partition the points clouds into blocks to perform the ICP algorithm for each block in parallel by minimizing the cost function of the bundle adjustment equation updated with a regularity term. The regularity term may measure the difference between current estimates of the poses and previous or the initial estimates. The method may also minimize the bundle adjustment equation updated with a regularity term when solving the pose graph problem to merge the optimized poses from the blocks to make connections between the blocks.

20 Claims, 11 Drawing Sheets

UPDATED POINT CLOUD REGISTRATION PIPELINE BASED ON ADMM ALGORITHM FOR AUTONOMOUS VEHICLES

TECHNICAL FIELD

Embodiments of the present disclosure relate generally to operating autonomous vehicles. More particularly, embodiments of the disclosure relate to methods for point clouds registration for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of motion planning and control operations depends on the sensors of the vehicle and a high-definition (HD) two-dimensional (2D) or three-dimensional (3D) point cloud map of the area to navigate. Sensors such as cameras, light detection and range (LIDAR) units, radars, etc., are used to capture video and electromagnetic images of environments around the vehicle. The ADV may process information captured by the sensors and traffic elements and road features provided by the HD 3D point cloud map to perceive driving environment surrounding the ADV for planning the motion of the ADV.

Sensors such as LIDAR sensors are also used to capture data points of an area to be mapped. The data points corresponding to a pose (e.g., position and orientation) of the LIDAR sensor used to capture the data points at a particular point in time are referred to as a point cloud. Point clouds captured by the LIDAR sensor at many poses are used to construct the HD 3D point cloud map of the area. Point cloud registration refers to a process of estimating the LIDAR's GPS positions and poses used during data capture to align point clouds of the area to be mapped. Alignment of the point cloud data allows an accurate HD 3D point cloud map to be constructed from blur areas in the raw point cloud map.

However, several problems exist which influence both the performance and accuracy of map construction. First, current point cloud registration algorithms are highly dependent on GP S signals for vehicle's simultaneous localization, which can have a margin of errors on the orders of meters. The errors are exacerbated by multi-path and other degradation of the GP S signals due to environmental factors such as city streets lined by tall buildings or dense forest. Or the GPS signal may fail to be received altogether, for example, in tunnels or garages. Second, the registration of point clouds may be computationally complex, e.g., challenging and time-consuming for large map areas.

To reduce the complexity, the map area may be divided into sub-maps and point cloud registration for a sub-map may be implemented on a corresponding computation node using a regional iterative closest point (ICP) algorithm. However, the size of a sub-map may be limited by a corresponding computation node's memory size, which in turn influences the accuracy of the map generated from the point cloud registration. Additionally, connections among the point cloud registration of the sub-maps performed by the computation nodes may be weak. The result is that the precision of the map constructed from the sub-maps may have a constant offset. Also, if the results of the point cloud registration are not acceptable, there is no clear way to restart the ICP algorithm. It is desirable to have a more flexible approach for point cloud registration that is less computationally intensive, and that leverages the connections among the point cloud registration of the sub-maps and optimizations within the ICP algorithm to improve performance.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
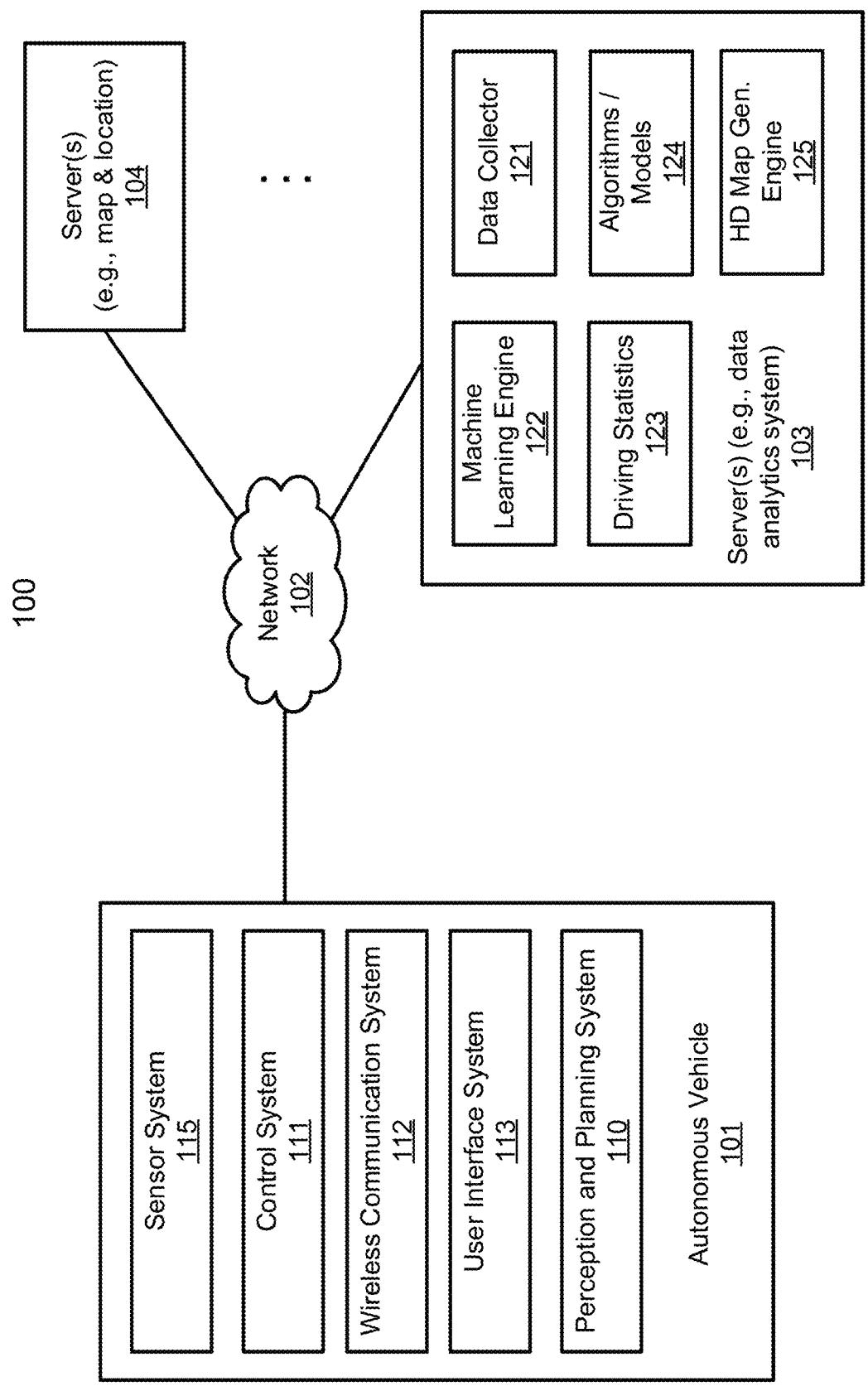
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Reference in the specification to "HD", or "high definition" such as HD maps or HD poses refers to maps or poses with a very high precision level. For example, HD maps can have a precision level of centimeters or tens of centimeters. A 2D or 3D HD point cloud map of a navigable area stores the traffic elements and road features for motion planning and control of an ADV such as features for localization and perception.

Point cloud registration during construction of the HD point cloud map estimates the LIDAR's GPS positions and poses used during the data capture phase to align point clouds of the area to be mapped. After alignment of the point cloud data, an HD 2D or 3D point cloud map may be constructed from the raw point cloud map. To reduce the computational complexity of the point cloud registration, the map area may be divided into smaller partitions or sub-maps. Point cloud registration for the sub-map may be implemented in parallel on computation nodes of a computing cluster using the regional iterative closest point (ICP) algorithm. The computational nodes of the computing cluster may have different memory resources, affecting the computational speed of the ICP algorithm and the accuracy of the constructed HD point cloud map. To reduce the dependencies of the accuracy of the map on the memory resources of the computational nodes, a method for ICP algorithm for a region is disclosed.

According to one embodiment, a method for point cloud registration may select point cloud poses that are characterized by higher confidence level during the data capture phase for use as reference poses. The selected poses, whose positions and orientations are fixed, are used as anchor poses for estimating and optimizing the positions and orientations of other point cloud poses during point cloud registration. Estimating and optimizing the poses of non-anchor poses with reference to the anchor poses reduces the number of decision variables to optimize during point cloud registration, reducing the memory requirement. In one embodiment, the method may use metrics such as the number of visible GPS satellites used to calculate the position of the pose, the standard deviation of the position, etc., to determine if the pose is an anchor pose.

The method may perform the ICP algorithm for the non-anchor poses of each sub-map in parallel. In one embodiment, the ICP algorithm is implemented by solving a bundle adjustment equation. The ICP algorithm solves the bundle adjustment equation in each sub-map by minimizing a cost function associated with aligning the points of the non-anchor point cloud poses with reference to the corresponding points of anchor poses in each sub-map. To connect the point cloud registration of the separate sub-maps and to leverage successive estimates of the poses within each sub-map to improve performance, a regularity term may be added to the cost function of the bundle adjustment equation.

According to one embodiment, the regularity term added to the cost function for a pose may be a measure of the geometric distance between the current estimate of the pose and the previous or the initial estimate of the pose. By minimizing the cost function for the pose that includes the regularity term, the ICP algorithm minimizes the differences between successive estimates of the pose and creates intermediate estimates from which the ICP algorithm may restart if the solution is not satisfactory. The regularity term may also be a function of the poses in overlapping areas between the sub-maps to connect the point cloud registration of the sub-maps.

According to one embodiment, the regularity term may be added to the cost function when merging the estimated poses of the different sub-maps to reconstruct the map. For example, when applying the pose graph to merge the estimated poses of the different sub-maps, the cost function of poses in the overlapping areas between two sub-maps may have the regularity term as a pose graph residual approximation. By minimizing the cost function that includes the regularity term of the poses in the overlapping area of the sub-maps, the connection between the point cloud registration may be strengthened. In one embodiment, the method may minimize the cost function using the alternating direction method of multipliers (ADMM) algorithms by writing the augmented Lagrangian of the cost function and solving the augmented Lagrangian problem with iterations.

According to one embodiment, the method to register point clouds for an ADV includes receiving point clouds and the corresponding initial poses from the ADV equipped with a sensor that captures the point clouds of a region to be mapped. The method also includes selecting fixed anchor poses from the initial poses. The method further includes separating the point clouds into a number of blocks or partitions. The method further includes identifying frame pairs from the point clouds in each block. Each frame pair includes a fixed anchor pose and a non-anchor pose. The method further includes identifying pairs of points from the point clouds of the frame pairs in each block. The method further includes optimizing the non-anchor poses with reference to the fixed anchor poses in each block based on the pairs of points of the frame pairs by constraining differences between the initial poses and the optimized poses of the non-anchor poses. The method further includes merging the optimized poses for the non-anchor poses from multiple blocks to generate optimized poses for the point clouds of the region by constraining differences between the initial poses and the optimized poses of the non-anchor poses in overlapping areas between the blocks.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download HD maps from servers 103 or 104 for use in motion planning and control.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
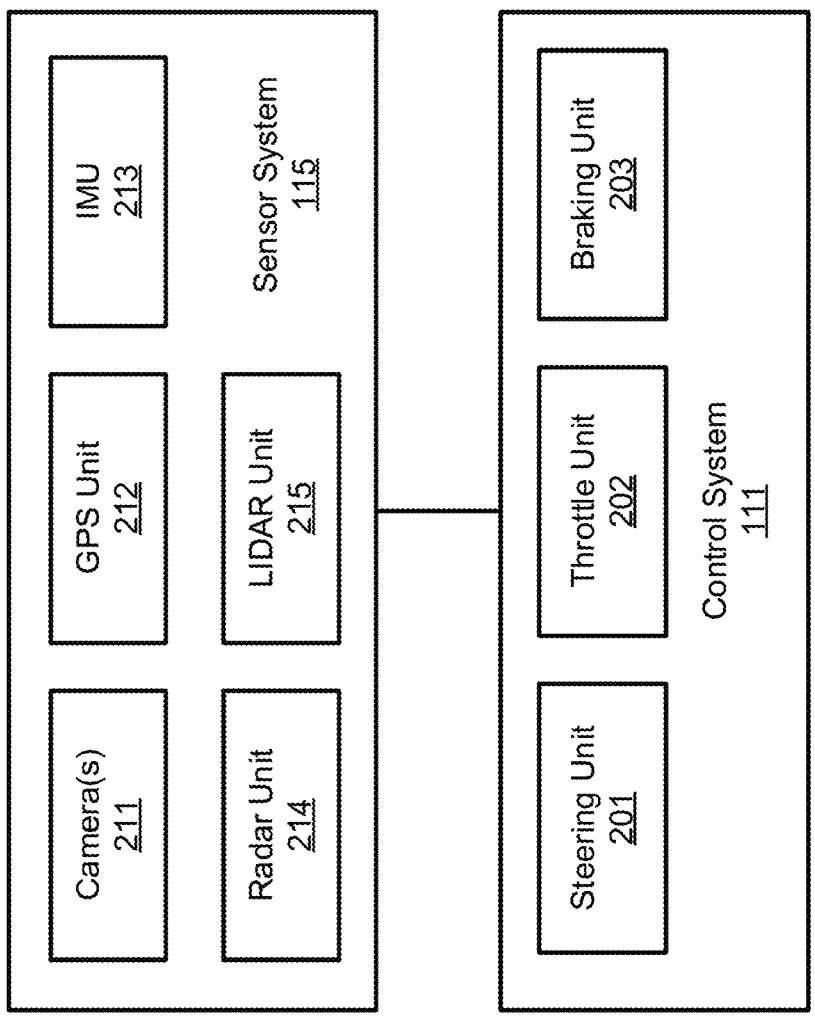
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor senses the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, the location and MPOI information may be obtained from HD maps downloaded from servers 103-104.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include point clouds information such as point clouds images of the features and objects of the driving environment captured by LIDAR sensors mounted on the vehicles, and corresponding poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include regional ICP algorithms, bundle adjustment algorithms, alternating direction method of multipliers (ADMM) algorithms, image segmentation algorithms (e.g., edge detection, motion detection, etc.), simultaneous localization and mapping (SLAM) algorithms, deep learning neural network models.

Algorithms 124 may be uploaded on ADVs to be utilized during autonomous driving in real-time or may be utilized by other modules such as HD map generation engine 125 of server 103. In one embodiment, HD map generation engine 125 can register the point clouds collected by the ADVs and generate a HD map based on the registered point clouds. Although HD map generation engine 125 is shown as part of server 103, in some embodiments, engine 125 may be part of server 104.

Figure 3A:
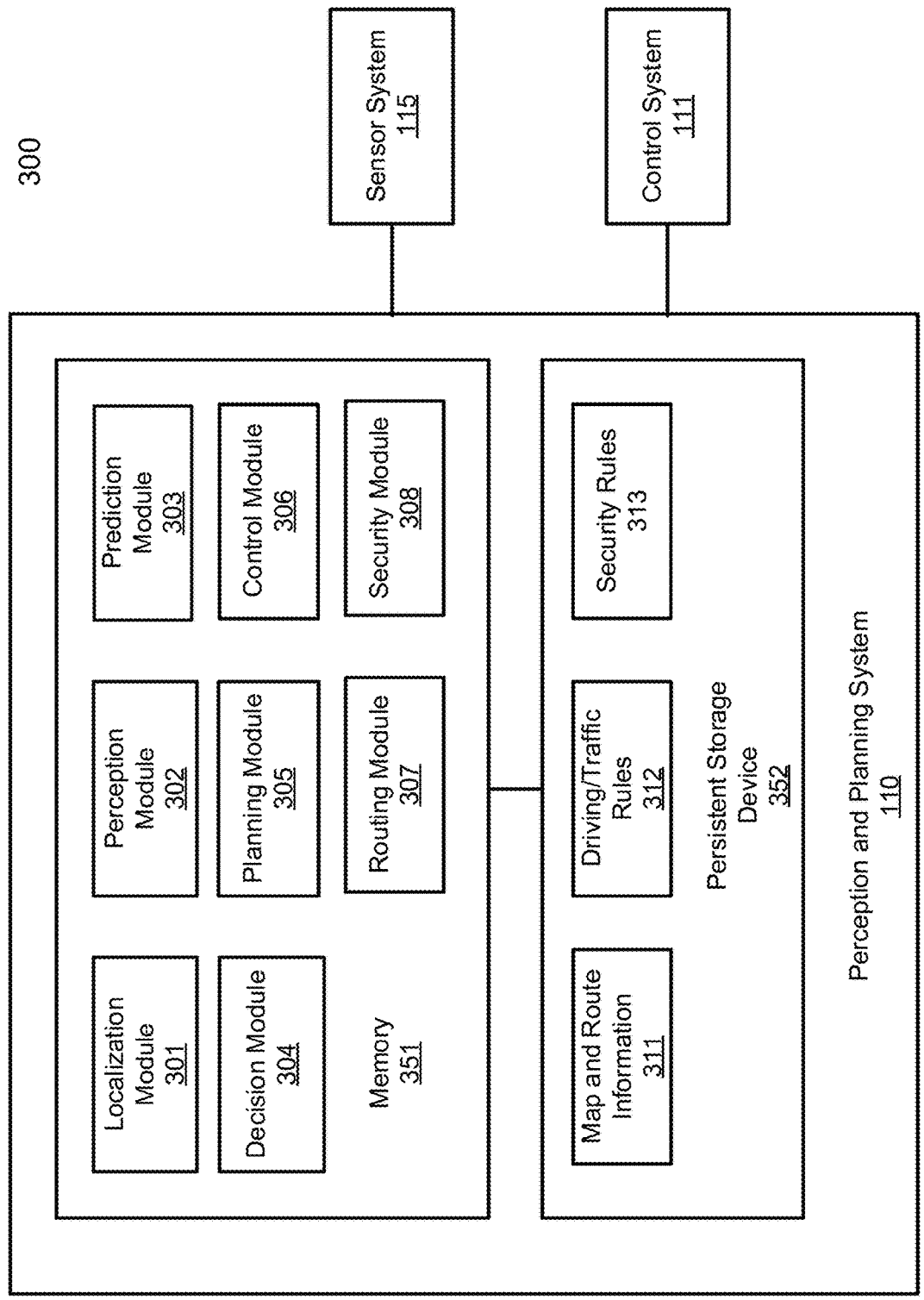
FIGS. 3A-3B are block diagrams illustrating an example of a perception and planning system used with an autonomous vehicle according to one embodiment.
Figure 3B:
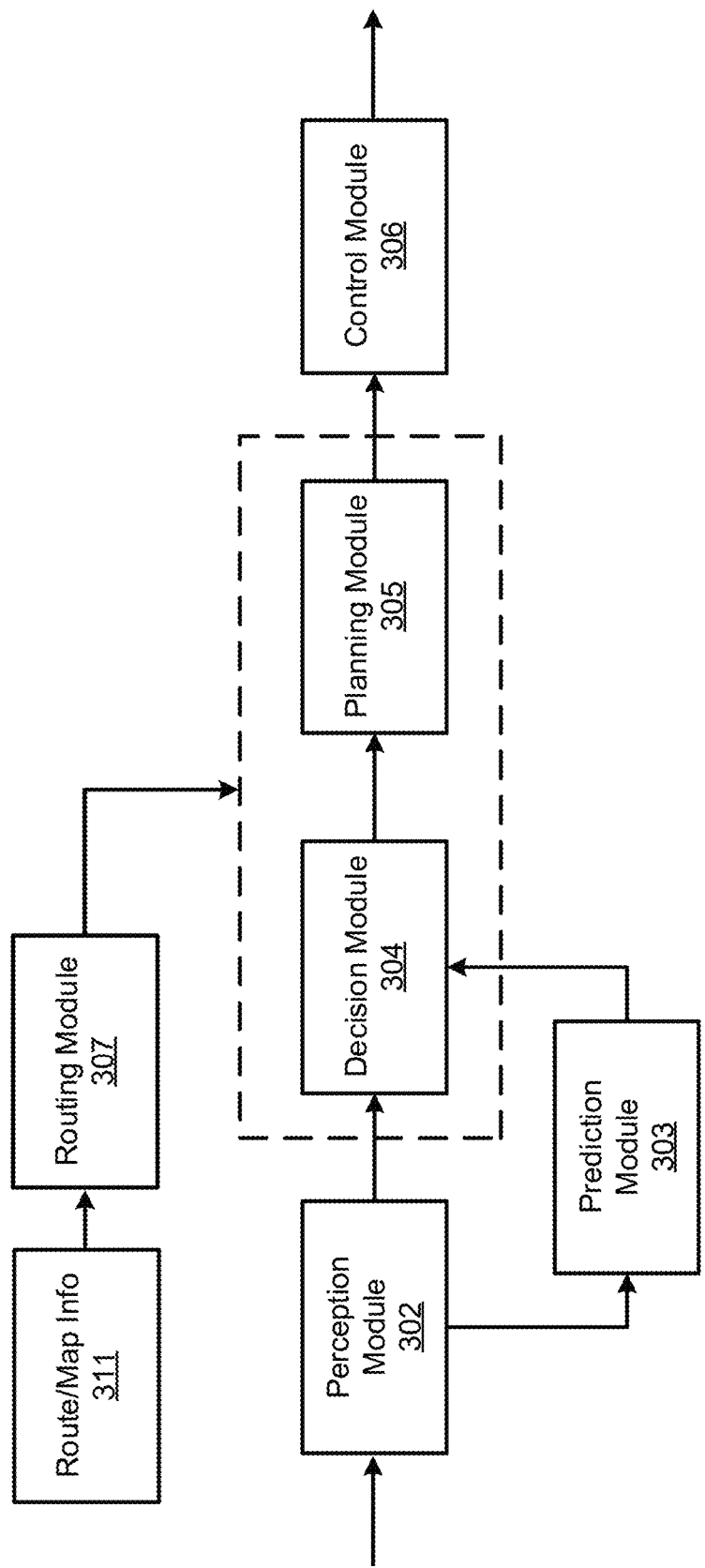

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and security module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. In one embodiment, the map and route information 311 may be HD maps constructed from raw point cloud data based on point cloud registration that estimates the sensor's GPS positions and poses during collection of the raw point cloud data. The HD maps may be downloaded from the location server and the MPOI server. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Thus, based on a decision for each of the objects perceived, decision module 304 and/or planning module 305 plans a path or route for the autonomous vehicle, as well as driving parameters (e.g., distance, speed, and/or turning angle), using the reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle. Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect pedestrians, vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, security module 308 is configured to detect cyber and spoof attacks based on a set of security rules 313. Security module 308 may be implemented as a part of perception module 302 or may communicate with perception module 302 or other modules. Security module 308 may detect changes to the autonomous vehicle's destination or abnormal re-routing activities to determine if there is a cyber-attack. Security module 308 may also detect spoofing on the autonomous vehicle's sensor system 115 to foil spoofing attacks. In one embodiment, security module 308 may inform the decision module 304 of the attacks so the autonomous vehicle may be switched to a fail-safe operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
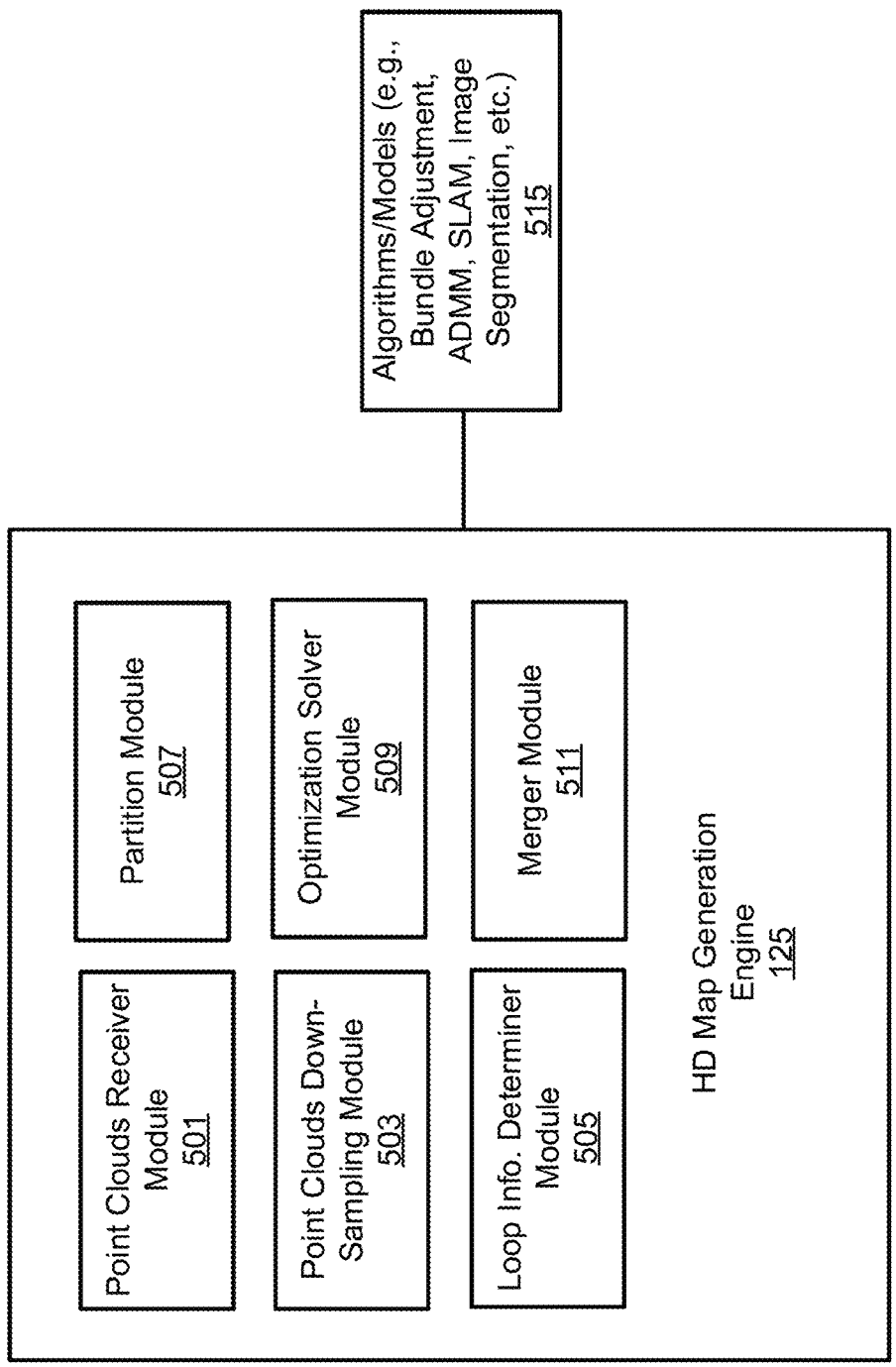
FIG. 5 is a block diagram illustrating an example of an HD map generation engine according to one embodiment.

FIG. 5 is a block diagram illustrating an example of a HD map generation engine 125 according to one embodiment. HD map generation engine can register point clouds and generate an HD map based on the point cloud registration. Referring to FIG. 5, HD map generation engine 125 can include a number of modules such as point clouds receiver module 501, point clouds down-sampling module 503, loop information determiner module 505, partition module 507, optimization solver module 509, and merger module 511. Note that some or all of these modules can be integrated into fewer modules or partitioned into more modules.

Point clouds receiver module 501 can receive point clouds (e.g., LIDAR images captured by LIDAR sensors of an ADV) and corresponding poses (e.g., position and orientation). A point cloud refers to a set of data points captured by, for example, a LIDAR device at a particular point in time. Each data point is associated with location information of the data point (e.g., x, y, and z coordinates). Point clouds down-sampling module 503, which may be optional, may down-sample the point clouds spatially or temporally. Loop information determiner module 505 can determine whether there is a loop closure for a set of point clouds corresponding to a navigable area that forms a geographic loop. Partition module 507 can partition one or more navigable areas into one or more partitions based on the closure information or block partition information. Optimization solver module 509 can apply an optimization algorithm (such as a bundle adjustment algorithm based on regional ICP, ADMM algorithm, SLAM algorithm, image segmentation algorithms, etc., as part of algorithms 515 of FIG. 5 or algorithms 124 of FIG. 1) to point clouds and corresponding poses of a partition to generate refined HD LIDAR poses for point cloud registration. Point cloud registration refers to alignment of point clouds data for an area to be mapped. Merger module 511 can merge the aligned point cloud data from a number of partitions together to generate the HD map.

Figure 6:
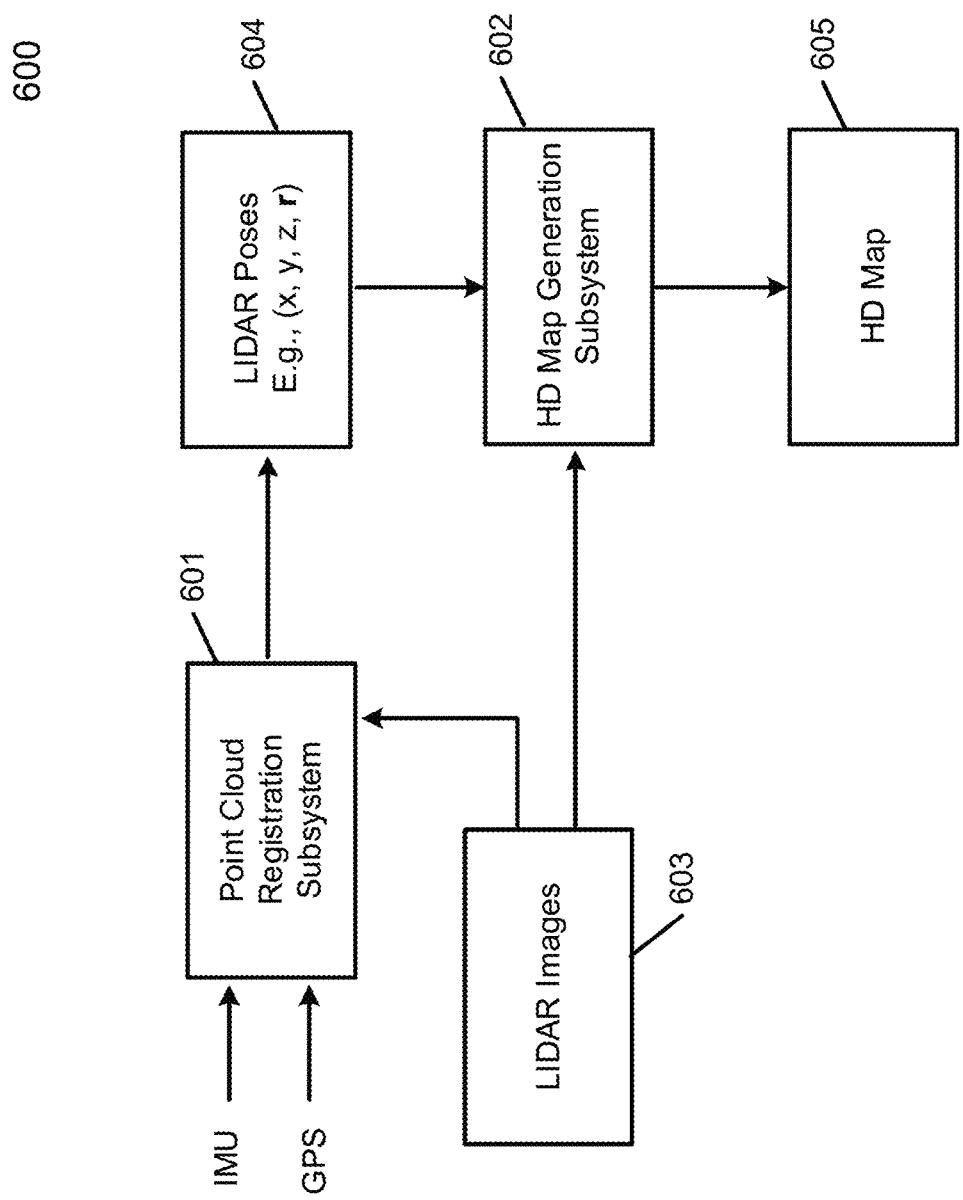
FIG. 6 is a block diagram illustrating an example of an HD map generation system according to one embodiment.

FIG. 6 is a block diagram illustrating an example of an HD map generation system according to one embodiment. HD map generation system 500 may be part of HD map generation engine 125 of FIG. 1. Referring to FIG. 6, in one embodiment, HD map generation system 600 includes point cloud registration subsystem 601 and HD map generation subsystem 602. Point cloud registration subsystem 601 can receive an IMU signal, a GPS signal, and LIDAR images 603 (e.g., from IMU 213, GPS unit 212, and LIDAR unit 215, respectively) as inputs and generates HD poses 604 (or aligns the poses for the LIDAR images 603) based on the received inputs. HD map generation subsystem 602 can then receive LIDAR images 603 and HD poses 604 as inputs and generate HD map 605 based on the inputs.

Figure 7:
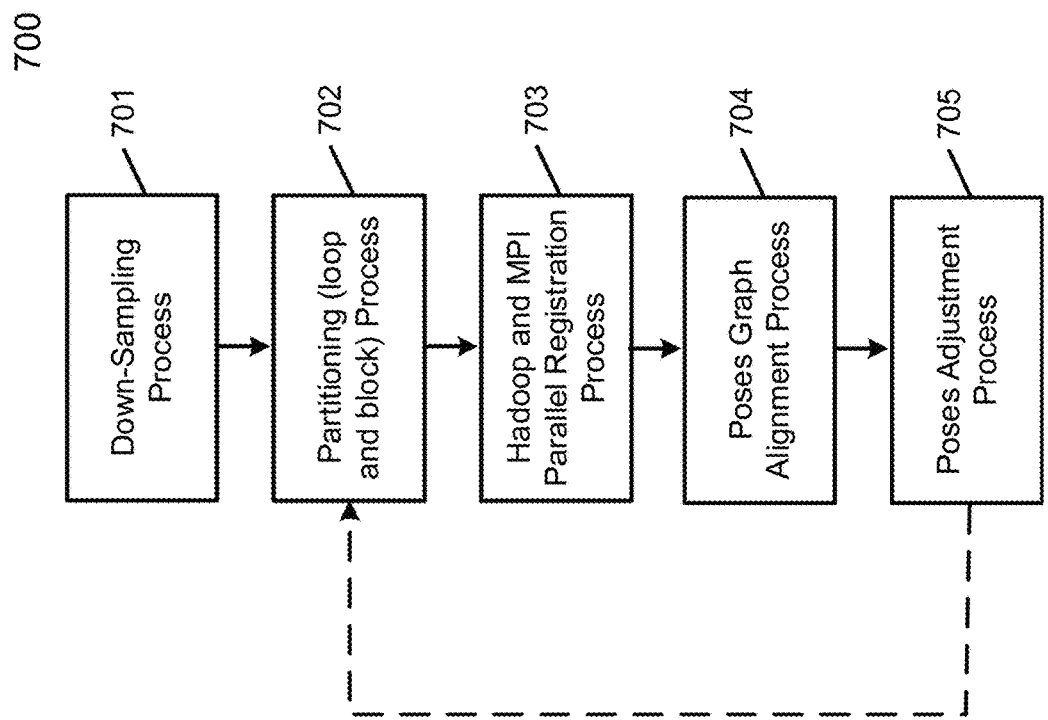
FIG. 7 is a block diagram illustrating an example of a point cloud data processing flow for an HD map generation system according to one embodiment.

FIG. 7 is a block diagram illustrating an example of a point cloud data processing flow for an HD map generation system according to one embodiment. Point cloud data processing flow 700 may be implemented by an HD map generation system such as system 600 of FIG. 6 or an HD map generation engine such as engine 125 of FIG. 5. Referring to FIG. 7, in one embodiment, point cloud data processing flow 700 includes, but is not limited to, down-sampling process 701, partitioning process 702, Hadoop and Message Passing Interface (MPI) parallel registration process 703, poses graph alignment process 704, and poses adjustment process 705. Some of these operations 701-705 may be performed by different processing nodes in series, in parallel, in a pipelined, or in a distributed manner by a map generation system. The different processes are described as follow.

The input to point cloud data processing flow 700 may be raw point clouds and their poses collected from LIDAR sensors or other sensors mounted on one or more ADVs. Usually the input contains tens or hundreds of thousands of LIDAR poses to be optimized and aligned. In order to minimize a number of input points, down-sampling process 701 may down sample the poses both spatially and/or temporally in a sequential manner.

In one embodiment, down-sampling process 701 may down-sample point clouds spatially. For example, down-sampling process 701 may determine a spatial sliding window. The sliding window may be a circular window with a predetermined radius. Down-sampling process 701 then identifies the LIDAR point clouds and the corresponding poses for all point clouds inside the spatial window for further processing. In one embodiment, the LIDAR point clouds may be identified based on a spatial region of interest, e.g., a central region of the sliding window.

In another embodiment, down-sampling process 701 may down-sample point clouds temporally. For example, down-sampling process 701 may determine a temporal sliding window to track a time sequence (e.g., using timestamps) of LIDAR point clouds for each spatial sliding window. Down-sampling process 701 may then identify LIDAR point clouds and the corresponding poses for further processing based on each time sequence. For example, if there are two time sequences, i.e. two time clusters, down-sampling process 701 may down-sample to a point cloud and a corresponding pose for the two time sequences. Down-sampling the point cloud temporally is especially useful for scenarios when an ADV is idle at a red stop light. In this case, the idle ADV can capture a time sequence of substantially identical LIDAR frames but only one LIDAR point cloud is useful. Thus down-sampling identifies one LIDAR point cloud for further processing for the time sequence instead of the multiple LIDAR point clouds of the time sequence that capture the similar point clouds for the red stop light. Thus, down-sampling would decrease a number of repetitive or similar point cloud data and optimizes the input data for the point cloud processing. The down-sampled point clouds are then partitioned by process 702.

In one embodiment, partitioning process 702 determines loop closure information based on one or more computer vision algorithms such as edge detection and/or image segmentation algorithms. For example, partitioning process 702 may detect features or image edges using a corner detection algorithm. A corner detection algorithm, such as a Harris corner detector, may extract and infer features from a LIDAR image (e.g., a point cloud). Partitioning process 702 may then detect and track one or more loops based on a combination of corresponding poses, detected features, and/or a collection of time and velocity information of the vehicle which can predict a location of the vehicle. In another embodiment, road loop closures may be identified based on road contours or features of road contours. Partitioning process 702 then partitions the point clouds into one or more sets of point clouds based on the loop closure information such that one set of point clouds corresponds to a loop.

In one embodiment, if a detected loop spans an area greater than a predetermined threshold, partition process 702 may apply a spatial partitioning to the loop partition and may further divide the loop partition into two or more blocks partition. This way, a computation load of each partition would not exceed a predetermined threshold. In one embodiment, loops are partitioned into blocks of a predetermined spatial area. The partitioned point clouds may then be registered in parallel by a node cluster of computational nodes in Hadoop and Message Passing Interface (MPI) process 703.

Point cloud registration refers to aligning various point clouds to a reference pose or point cloud. For each loop or block partition, to align the point clouds in the partition, the point clouds corresponding to the partition is applied an optimization algorithm to generate HD LIDAR poses for the point clouds. For example, process 703 may apply an iterative closest point (ICP) algorithm to a set of point clouds. Note, ICP is an algorithm employed to minimize the difference between two point clouds. ICP is often used to reconstruct 2D or 3D surfaces from different scans. For ICP, one point cloud, e.g., a reference, is kept fixed, while the others are transformed to best match the reference. The algorithm iteratively revises a transformation (e.g., translation and rotation) required to minimize an error metric, e.g., a sum of squared differences between the coordinates of the matched pairs, or a distance from the other point clouds to the reference point cloud.

For example, for point cloud i with a corresponding LIDAR pose, the LIDAR pose (x, y, z, (yaw, pitch, and roll)) corresponding to a transformation matrix (e.g., $\mathcal{R}_i=(t_i, R_i)$, where $t_i$ is a translation and $R_i$ is a rotation transformation) can be used to project point cloud i from a relative coordinate system (relative to a vehicle) to a Universal Transverse Mercator (UTM) coordinate system. The projection equation is then: $f_{\mathcal{R}_i}(x_k)=R_i x_k+t_i$, where $x_k$ is any point from the set of point cloud i, $t_i$ is a translation, and $R_i$ is a rotation transformation.

For each partition, process 703 can identify related point cloud pairs (or frame pairs) based on point clouds' poses as $\mathfrak{F}$, where the pair $\mathfrak{S}_{(i,j)} \in \mathfrak{F}$ represents the pair of point cloud i and point cloud j. Then the points between pair of point clouds can be defined as: $(x_k, x_l) \in \mathfrak{P}_{(i,j)}$, where $x_k$ is a point from LIDAR point cloud index i, $x_l$ is a point from LIDAR point cloud index j, where $\mathfrak{P}_{(i,j)}$ represents the pair of points from the pair of point cloud pairs with index i and j. The point pair $\mathfrak{P}_{(i,j)}$ is measured by each point cloud's input position, which is usually from, but not limited to, GPS signals. A bundle adjustment (BA) equation of the ICP algorithm based on the above, to be optimized, is then as follow:

$$min_{\mathcal{R}_i \in P} \Sigma_{\mathfrak{S}_{(i,j)} \in \mathfrak{F}} \Sigma_{(x_k, x_l) \in \mathfrak{P}_{(i,j)}} \|(f_{\mathcal{R}_i}(x_k) - f_{\mathcal{R}_j}(x_j)) \cdot \vec{n}_v\|(P) \quad \text{[Equation 1]}$$

where $\vec{n}_v$ is the norm vector at point $x_k$.

The above equation (P) may be solved by an optimization algorithm such as Levenberg Marquardt (LM) algorithm, however, its complexity is around O(m^3) where m is the number of frame pairs. LM algorithm is used to solve non-linear least squares curve-fitting problems by finding a local minimum. In one embodiment, equation (P) may be subdivided into one or more sub-problems and these sub-problems can be applied an optimization algorithm (such as ADMM algorithm) to be solved separately. In one embodiment, these sub-problems are solved in parallel using the computational nodes of a node cluster. For example, for a given frame pair $\mathfrak{F}_m \subseteq \mathfrak{F}$, the pose transformation matrix for the i-th point cloud for the m-th frame pair is $\mathcal{R}_i^m$, where the upper-subscript represents the index of subset of frame pair m and the lower-subscript represents the index of point cloud i in the set of point clouds P. Then the bundle adjustment equations based on the parallel pipeline, to be optimized, is then as follow:

$$min_{\mathcal{R}_i \in P} \Sigma_{\mathfrak{S}_{(i,j)} \in \mathfrak{F}_i} \Sigma_{(x_k, x_l) \in \mathfrak{P}_{(i,j)}} \|((f_{\mathcal{R}_i^m}(x_k) - f_{\mathcal{R}_j^m}(x_j)) \cdot \vec{n}_v\|(P_m), \quad \text{[Equation 2]}$$

where $\mathcal{R}_i^m = \mathcal{R}_i, \forall \mathfrak{F}_i \subseteq \mathfrak{F}$, and $\forall \mathcal{R}_i \in P$.

In this example, the optimization algorithm can be processed by one or more nodes of a node cluster, e.g., each node processes a frame pair. In one embodiment, whether frame pairs are related can be determined based on a timestamp corresponding to the pair of frames, e.g., frame pairs which have consecutive timestamps or are within a time threshold can be related frame pairs. In another embodiment, related frame pairs can be determined based on loop closure information. For example, two frames which have separate timestamps but coincide with a same or similar location can be related frames (e.g., loop closures). In this case, the point clouds for the two frames should be substantially similar or matching. Once the poses are aligned or registered for each partition, the partitions can be merged together by process 704.

In one embodiment, poses graph alignment process 704 may merge the individual partitions into a larger map partition based on a pose graph alignment algorithm, such as a simultaneous localization and mapping (SLAM) algorithm. In one embodiment, overlapping areas for side-by-side partitions are coupled together such that only one set of output is necessary for the overlapping area, e.g., only one set of overlapping routes is necessary if the overlapping area is a route common to both areas.

In one embodiment, poses adjustment process 705 may further refine or adjust the poses to a UTM coordinate system. For example, previously, one pose is assumed as a reference pose to align other poses and point clouds. Process 705 can apply a final pose adjustment to decrease an overall error for mapping to the UTM coordinate system. For example, process 705 may analyze the input LIDAR poses for GPS confidence levels by comparing corresponding poses before and after optimization algorithm is applied. A pose (or poses) identified with the most confidence, e.g., a change between the received pose and the calculated HD pose is below a threshold, are kept for pose adjustment. Poses whose changes in positions after pose adjustment are above the threshold may be sent back to processes 702-704 for additional iterations of pose adjustment until the changes in positions are brought below the threshold. All the poses are then applied a rigid body transform based on the identified pose. A rigid body transformation is a transformation which preserves a shape and size of the object to be transformed. Here, a rotational or a reflectional transformation is a rigid body transformation, while scaling is not a rigid body transformation. Finally, the point clouds with the adjusted poses are used to generate a high definition (HD) 3D point clouds map. In one embodiment, the 3D point clouds map can be transformed into a 2D localization map with a top-down view.

Point cloud registration may also identify poses that have a high confidence level during the data capture phase to use as fixed reference poses to align other poses and point clouds of frame pairs when applying the iterative ICP algorithm in process 703. Point cloud registration may also use the fixed references poses during the pose graph alignment process 704. Solving the bundle adjustment equations based on references poses possessing a high confidence level reduces the number of decision variables to optimize and reduces the probability of multiple optimal solutions. As mentioned, after process 704, there may be a quality check. For example, point adjustment process 705 may compare each point cloud pose's positional changes after pose adjustment, and if the changes are large, the results may be sent back to process 702 again for another iteration until the result from 704 passes the quality check.

Figure 8:
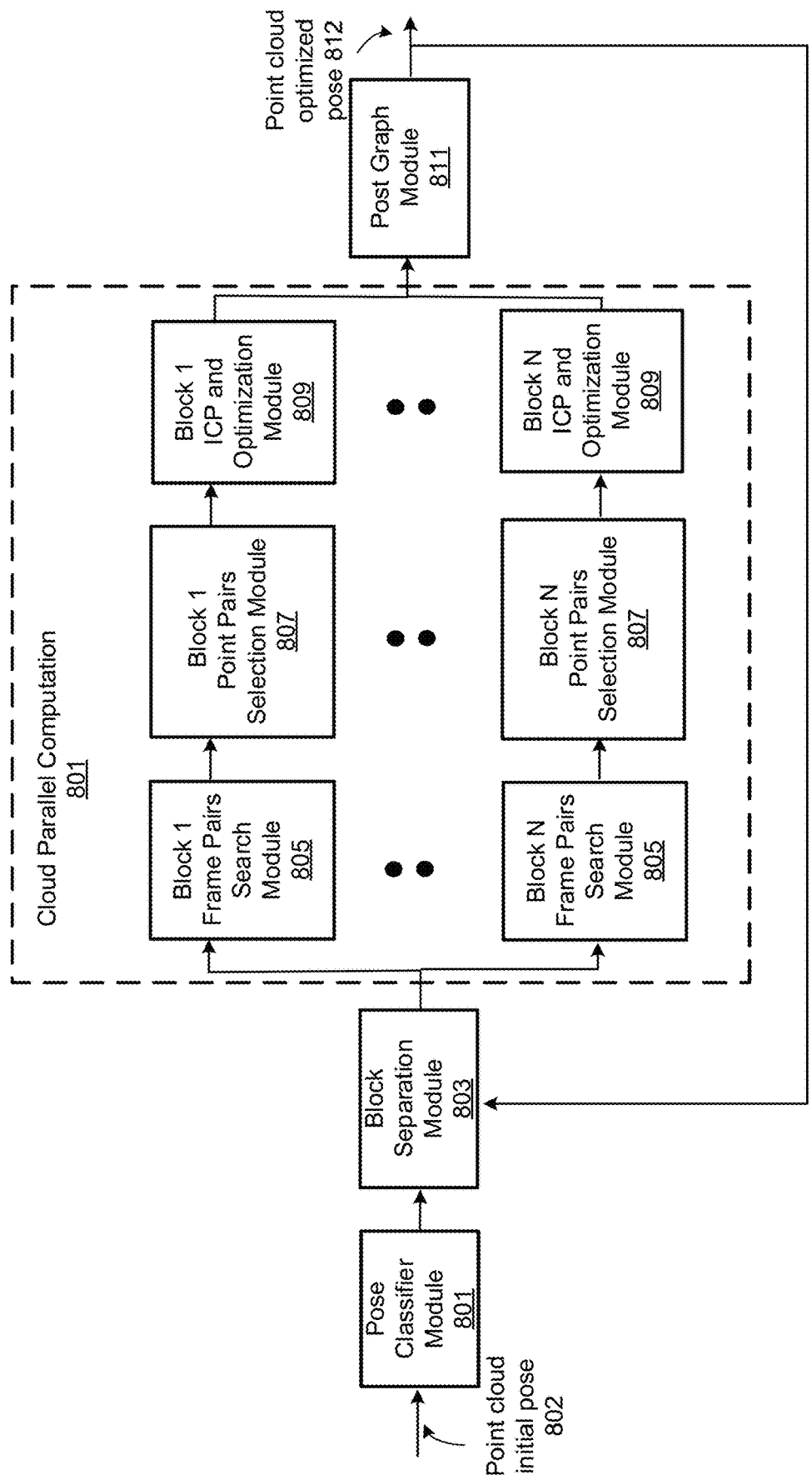
FIG. 8 is a block diagram of a point cloud registration pipeline with parallel computations of sub-maps of a region in separated blocks based on reference LIDAR poses possessing a high confidence level according to one embodiment.

FIG. 8 is a block diagram of a point cloud registration pipeline with parallel computations of sub-maps of a region in separated blocks based on reference LIDAR poses possessing a high confidence level according to one embodiment. A pose classifier module 801 may receive the initial LIDAR poses (position, orientation) 802 of point clouds. The initial poses 802 may have associated metadata that allows the pose classifier module 801 to identify those poses whose optimized poses after the point cloud registration are likely to be close to their initial poses (e.g., the change between the optimized pose and the initial pose is below a threshold). These poses identified as having a high confidence level during the data capture phase may be used as fixed anchor poses for estimating and optimizing the positions and orientations of other point cloud poses during point cloud registration. In one embodiment, pose classifier module 801 may measure metrics such as the number of visible GPS satellites used to calculate the INSPVA (inertial navigation system position velocity and attitude) of the pose, the standard deviation of the INSPVA, etc., to determine if the pose is selected as an anchor pose.

A block separation module 803 may partition the point clouds into a number of partitions or blocks to reduce the computational loads for optimizing the poses of the point clouds. The partitioned point clouds may be registered in parallel by a cluster of parallel computational nodes 801. In one embodiment, block separation module 803 may partition the point clouds so that the maximum distance between frame pairs in a block does not exceed a threshold. In one embodiment, block separation module 803 may partition the point clouds so that the maximum number of point clouds in a block does not exceed a threshold since the complexity and the computational loading of the ICP algorithm is a function of the number of frame pairs.

The parallel computation nodes 801 of the cluster separately optimize in parallel non-anchor poses with reference to the fixed anchor poses in each block. A frame pairs search module 805 associated with each block searches for related point cloud pairs or frame pairs in each block, each frame pair including a non-anchor pose and an anchor pose. In one embodiment, frame pairs search module 805 may identify frame pairs based on timestamps corresponding to the frame pairs, for example, when two poses have consecutive timestamps or timestamps that are within a time threshold. In one embodiment, frame pairs search module 805 may identify frame pairs based on the positions corresponding to the frame pairs, for example, when the geometric distance between the two poses is within a distance threshold.

A point pairs selection module 807 associated with each block selects pairs of points in the frame pairs identified by frame pairs search module 805 to apply the ICP algorithm. The ICP algorithm may be implemented by solving the bundle adjustment equations of Equation 1 or Equation 2 in each block by minimizing a cost function associated with aligning the points of the non-anchor point cloud poses with reference to the corresponding points of the anchor poses of the frame pairs. To connect the point cloud registration of the parallel computation nodes 801 and to leverage successive estimates of the poses within each block to improve performance, a regularity term may be added to the cost function of the bundle adjustment equation.

The bundle adjustment equation of Equation 1 updated with the regularity term for a block may be expressed as:

$$min_{\mathcal{R}_i \in P|\{\mathcal{R}_c\}} \Sigma_{\mathfrak{E}_{(i,j)} \in \mathbb{B}} \Sigma_{(x_k, x_l) \in \Psi_{(i,j)}} \|((f_{\mathcal{R}_i}(x_k) - f_{\mathcal{R}_j}(x_l)) \cdot \vec{n_l})\| + \alpha \Sigma_{\{\mathcal{R}_i\}} \|\mathcal{R}_i - \overline{\mathcal{R}_i}\|_D^2 \quad \text{[Equation 3]}$$

where $\{\mathcal{R}_c\}$ are the anchor poses selected by pose classifier module 801. $\{\mathcal{R}_i \in P | \{\mathcal{R}_c\}$ are the non-anchor poses in the set of point clouds P in the block. $\Sigma_{\{\mathcal{R}_i\}} \|\mathcal{R}_i - \overline{\mathcal{R}_i}\|_D^2$ is the regularity term added to the bundle adjustment equation and α is a weighting factor. The regularity term may be a measure of the sum of the geometric distance between the current estimate $\mathcal{R}_i$ of the pose and the previous or the initial estimate $\overline{\mathcal{R}_i}$ of the pose. By minimizing the cost function for the pose that includes the regularity term, the ICP algorithm minimizes the differences between successive estimates of the pose and creates intermediate estimates from which the ICP algorithm may restart if the solution is not satisfactory. Equation 3 may be derived from the ICP problem's augmented Lagrangian by alternating direction method of multipliers (ADMM) and is described in the following paragraphs.

An ICP and optimization module 809 associated with each block may solve the updated bundle adjustment equation of Equation 3 to optimize the non-anchor poses in each block. In one embodiment, the regularity term may be a function of the non-anchor poses in the overlapping areas between the blocks to connect the point cloud registration performed by the blocks of the parallel computation nodes

801. However, because it may be difficult to determine which non-anchor poses are in the overlapping areas between a block and neighboring blocks, for ease of implementation, the regularity term for a block may include all non-anchor poses in the block.

A post graph module 811 may merge the optimized poses from all the blocks of the parallel computation nodes 801 to generate the optimized poses for a region. In one embodiment, post graph module 811 may apply the SLAM algorithm to couple overlapping areas between the blocks. According to one embodiment, a regularity term may be added to the cost function when merging the optimized poses of the different blocks. For example, when applying the pose graph to merge the optimized poses of the blocks, the cost function of the poses in the overlapping areas between two neighboring may have the regularity term as a pose graph residual approximation. By minimizing the cost function that includes the regularity term of the poses in the overlapping area of the blocks, the post graph module 811 may minimize the differences in the values of the optimized poses in the overlapping area and may strengthen the connection between the point cloud registration performed by the blocks. In one embodiment, post graph module 811 may minimize the cost function to optimize the non-anchor poses with reference to the fixed anchor poses when merging the poses.

In one embodiment, the cost function of the ICP problem may be minimized using the ADMM algorithms by writing the cost function as the augmented Lagrangian of the cost function and solving the augmented Lagrangian problem with iterations, such as by ICP and optimization module 809 and post graph module 811. For example, the bundle adjustment equation of Equation 1 may be relaxed by changing the cost term between the overlapping areas to pose graph cost terms. The pose graph cost terms may be the regularity term. The bundle adjustment equation updated with the regularity term may be expressed as:

$$min_{\mathcal{R}_i} \Sigma_{\mathfrak{F}_l} \Sigma_{\Theta_{(i,j)} \in \mathfrak{F}_l} \Sigma_{(x_k, x_l) \in \mathfrak{W}_{(i,j)}} \|(f_{\mathcal{R}_i}(x_k) - f_{\mathcal{R}_j}(x_l)) \cdot \vec{n}_l\| + \Sigma_{\Theta_{(i,j)} \in \mathfrak{F}_c} p_{i,j}(R_i, R_j)$$ [Equation 4]

where $\mathfrak{F}_l$ is the non-overlapping area of a block, $\mathfrak{F}_c$ is the overlapping area of the block, $p_{i,j}(R_i, R_j)$ is the pose graph residual function of pose $R_i$ and pose $R_j$, which is a slack variable in the overlapping area. Equation 4 may also be expressed as:

$$min_{\mathcal{R}_i} \Sigma_{\mathfrak{F}_l} \Sigma_{\Theta_{(i,j)} \in \mathfrak{F}_l} \Sigma_{(x_k, x_l) \in \mathfrak{W}_{(i,j)}} \|(f_{z_{l,i}}(x_k) - f_{z_{l,j}}(x_l)) \cdot \vec{n}_l\| + \Sigma_{\Theta_{(i,j)} \in \mathfrak{F}_c} p_{i,j}(R_i, R_j)$$ [Equation 5]

where $z_{l,i}$ and $z_{l,j}$ are the point cloud poses i and j in block l, with the constraint that $z_{l,i} = R_i$, for $\forall$ l, i. Equation 5 may be solved by ADMM algorithms with parallel ICP and optimization module 809 and post graph module 811 by rewriting Equation 5 as the augmented Lagrangian and solving the augmented Lagrangian problem with iterations. The regularity terms in Equation 3 may then be introduced during this process.

The optimized poses 812 of the point clouds from point graph module 811 may be fed back to block separation module 803 for repartitioning into blocks for the next iteration of the point cloud registration. The cluster of parallel computational nodes 801 may again apply the ICP algorithm in parallel to the partitioned point clouds and post graph module 811 may again merge the optimized poses from all the blocks to generate the optimized poses for the next iteration. Multiple iterations may be run until the optimized poses meet acceptable criteria.

Figure 9:
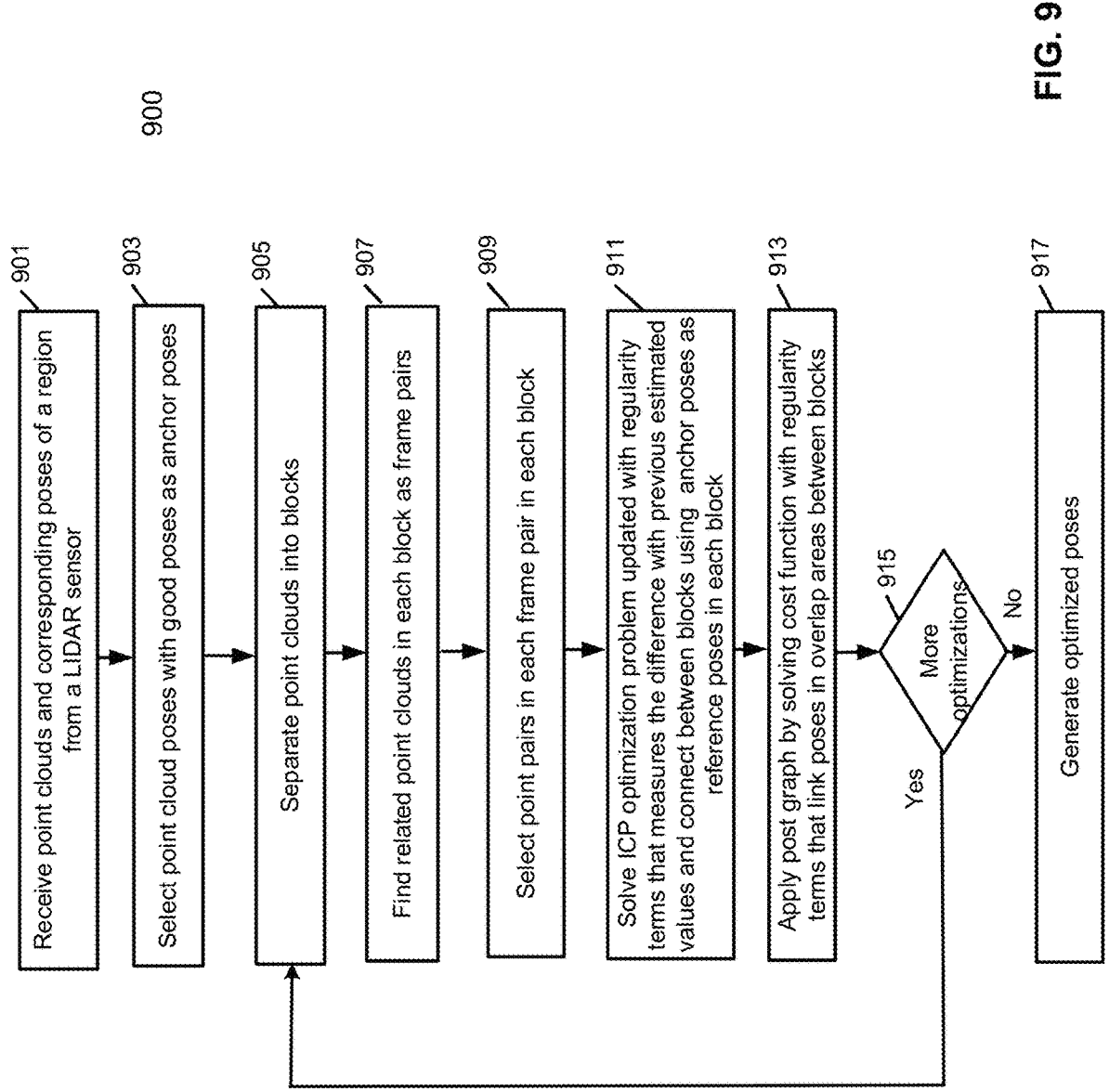
FIG. 9 is a flow diagram illustrating an example of a method for using anchor poses to iteratively solve an updated ICP optimization problem in each block and to solve an updated cost function of a pose graph according to one embodiment.

FIG. 9 is a flow diagram illustrating an example of a method for using anchor poses to iteratively solve an updated ICP optimization problem in each block and to solve an updated cost function of a pose graph according to one embodiment. Method 900 may be performed by processing logic which may include software, hardware, or a combination thereof. For example, method 900 may be performed by a map generation engine of an autonomous vehicle, such as HD map generation engine 125 of server 103.

At operation 901, the method 900 receives point clouds and corresponding poses of a region from a LIDAR sensor. The point clouds may represent images captured by the LIDAR sensor of a region corresponding to the initial poses (position, orientation) of the ADV.

At operation 903, the method 900 selects those point cloud poses identified as having a high confidence level during the data capture phase as anchor poses because the optimized poses of these poses after point cloud registration are not expected to change by more than a threshold from their initial poses. The method 900 may fix the anchor poses for estimating and optimizing the positions and orientations of other point cloud poses during point cloud registration. In one embodiment, operation 903 may measure metrics such as the number of visible GPS satellites used to calculate the INSPVA of the pose, the standard deviation of the INSPVA, etc., to determine if the pose is selected as an anchor pose.

At operation 905, the method 900 separates the point clouds into a number of partitions or blocks. The partitioned point clouds may be optimized in parallel, such as by the parallel computational nodes 801. In one embodiment, operation 905 may partition the point clouds so that the maximum distance between frame pairs in a partition does not exceed a threshold. In one embodiment, operation 905 may partition the point clouds so that the maximum number of point clouds in a partition does not exceed a threshold.

At operation 907, the method 900 searches for related point cloud pairs or frame pairs in each partition. Each frame pair may include a non-anchor pose and an anchor pose. In one embodiment, operation 907 may identify frame pairs based on timestamps corresponding to the frame pairs, for example, when two poses have consecutive timestamps or timestamps that are within a time threshold. In one embodiment, operation 907 may identify frame pairs based on the positions corresponding to the frame pairs, for example, when the geometric distance between the two poses is within a distance threshold.

At operation 909, the method 900 selects points in the identified frame pairs in each partition. For each frame pair, operation 909 may select points from the non-anchor pose and corresponding points from the anchor pose to apply the ICP algorithm.

At operation 911, the method 900 applies the ICP algorithm by solving the bundle adjustment equation updated with a regularity term in each partition for the selected points of frame pairs. The regularity term may be a measure of the sum of the geometric distance between the current estimate of the poses and the previous or the initial estimates of the poses of the frame pairs. By minimizing the cost function of the bundle adjustment equation that includes the regularity term for the poses, the ICP algorithm minimizes the differences between successive estimates of the poses and creates intermediate estimates from which the ICP algorithm may restart if the solution is not satisfactory. Operation 911 may apply the ICP algorithm to optimize the non-anchor poses with reference to the anchor poses in each partition.

At operation 913, the method 900 applies post graph to the optimized poses of the partitions to merge the partitions by solving the bundle adjustment equation updated with a regularity term that links the optimize poses in the overlapping areas between the partitions. The regularity term may be a pose graph residual function of poses in the overlapping areas. By minimizing the cost function of the bundle adjustment equation that includes the regularity term of the poses in the overlapping area of the blocks, operation 913 may minimize the differences in the values of the optimized poses in the overlapping area and may strengthen the connection between the ICP algorithms in the partitions. Operation 913 may minimize the cost function to optimize the non-anchor poses with reference to the fixed anchor poses when merging the poses. In one embodiment, the method may minimize the cost function using the ADMM algorithms by writing the cost function as the augmented Lagrangian of the cost function and solving the augmented Lagrangian problem with iterations.

At operation 915, the method 900 determines if the non-anchor poses are to be further optimized through additional iterations of the point cloud registration. In one embodiment, operation 915 may determine to further optimize the non-anchor poses if the precision of the map constructed from the sub-maps of the partitions may have a constant offset. If further optimization is desired, the method 900 may return to operation 905 to repartition the point clouds and may perform the next iteration of operations 907-913 to apply the ICP algorithm by solving the bundle adjustment equation updated with the regularity term in the partitions and to apply post graph to the optimized poses of the partitions by solving the bundle adjustment equation updated with the regularity term that links the optimize overlapping areas between the partitions.

At operation 917, if further optimization is not desired, the method generates the optimized poses for the region from the merged partitions of the post graph.

Figure 10:
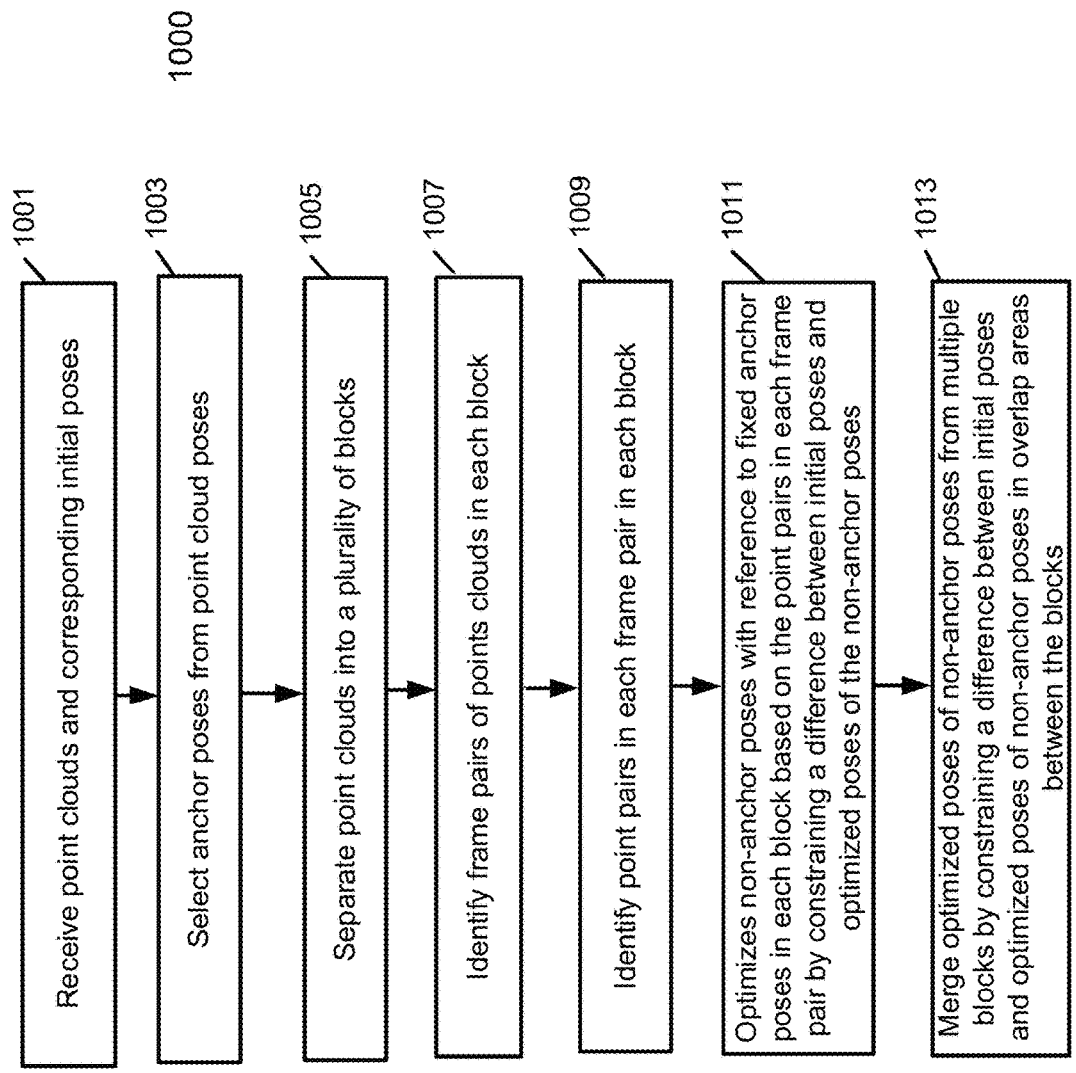
FIG. 10 is a flow chart illustrating an example of a method for selecting anchor poses and solving an ICP optimization problem updated with regularity terms in each block and for minimizing a cost function updated with regularity terms to merge the blocks with reference to the anchor poses according to one embodiment.

FIG. 10 is a flow chart illustrating an example of a method for selecting anchor poses and solving an ICP optimization problem updated with regularity terms in each block and for minimizing a cost function updated with regularity terms to merge the blocks with reference to the anchor poses according to one embodiment. Method 1000 may be performed by processing logic which may include software, hardware, or a combination thereof. For example, method 1000 may be performed by a map generation engine of an autonomous vehicle, such as HD map generation engine 125 of server 103.

At operation 1001, the method 1000 receives point clouds and corresponding poses of a region from a LIDAR sensor of an ADV. The LIDAR poses may be the positions and orientations of LIDAR sensors of an ADV when the corresponding point clouds of the region are captured by the LIDAR sensor. The point clouds may represent images captured by the LIDAR sensor of a region corresponding to the initial poses (position, orientation) of the ADV.

At operation 1003, the method 1000 selects those point cloud poses identified as having a high confidence level during the data capture phase as anchor poses. The method 1000 may fix the anchor poses for estimating and optimizing the positions and orientations of other point cloud poses during point cloud registration. For example, the method 1000 may use the fixed anchor poses for optimizing non-anchor poses during the ICP optimization and solving pose graph problem.

At operation 1005, the method 1000 separates the point clouds into a number of partitions or blocks to reduce the computational loads for optimizing the poses of the point clouds. The partitioned point clouds may be optimized in parallel, such as by the parallel computational nodes 801.

At operation 1007, the method 1000 identifies related point cloud pairs or frame pairs in each block. Each frame pair may include a non-anchor pose and a fixed anchor pose. The frame pair may be identified based on temporal or spatial relationship between the poses of the frame pair.

At operation 1009, the method 1000 identifies points in the identified frame pairs in each block. For each frame pair, operation 1000 may select points from the non-anchor pose and corresponding points from the fixed anchor pose to apply the ICP algorithm.

At operation 1011, the method 1000 optimizes the non-anchor poses with reference to the fixed anchor poses in each block to generate optimized poses based on the selected points from the frame pairs by constraining a difference between the initial poses and the optimized poses of the non-anchor poses. In one embodiment, operation 1011 solves the ICP optimization problem by solving the bundle adjustment equation updated with a regularity term in each block for the selected points of the frame pairs to optimize the non-anchor poses. The regularity term measures the sum of the differences between the estimated poses and initial poses of the non-anchor poses using the fixed anchor poses as the references poses in each block. Solving the bundle adjustment equation by minimizing the cost function of the bundle adjustment equation that includes the regularity term for the non-anchor poses minimizes the differences between the optimized pose and the initial pose of the non-anchor poses to improve performance of the ICP optimization problem.

At operation 1013, the method 1000 merges the optimized poses for the non-anchor poses from the multiple blocks to generate optimized poses for the point clouds of the region by constraining a difference between the initial poses and the optimized poses of the non-anchor poses in the overlapping areas between the blocks. In one embodiment, operation 1013 applies a post graph to the optimized poses of the multiple blocks to merge the optimized poses from the multiple blocks by solving the bundle adjustment equation updated with a regularity term that links the optimize poses in the overlapping areas between the blocks. The regularity term may be a pose graph residual function of non-anchor poses in the overlapping areas. Solving the bundle adjustment equation by minimizing the cost function of the bundle adjustment equation updated with the regularity term of the non-anchor poses in the overlapping area of the blocks strengthens the connections between the ICP algorithms of the blocks to improve performance of the point cloud registration.

A data processing system may perform any of the processes or methods described above, such as, for example, the cyber-attack or the spoofing detection method. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC)

microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for registering point clouds for an autonomous driving, the method comprising:
    selecting one or more anchor poses from a plurality of initial poses associated with a plurality of point clouds of a region having a plurality of blocks to be mapped;
    identifying one or more frame pairs from the plurality of point clouds in each block, each of the frame pairs including one of the anchor poses and one of a plurality of non-anchor poses;
    optimizing the non-anchor poses with reference to the anchor poses that are fixed in each block to generate optimized poses for the non-anchor poses based on a plurality of pairs of points between each of the frame pairs by constraining differences between the initial poses and the optimized poses of the non-anchor poses; and
    merging the optimized poses to generate a plurality of optimized poses for the point clouds of the region in overlapping areas between the blocks.

2. The method of claim 1, wherein optimizing the non-anchor poses with reference to the anchor poses that are fixed in each block comprises:
    solving an iterative closest point (ICP) algorithm that includes a regularity term of the non-anchor poses in each block to generate the optimized poses for the non-anchor poses.

3. The method of claim 2, wherein the regularity term of the non-anchor poses comprises differences between the initial poses and the optimized poses of the non-anchor poses and wherein solving the ICP algorithm that includes the regularity term of the non-anchor poses in each block to generate the optimized poses for the non-anchor poses comprises:
    minimizing a bundle adjustment equation updated with the regularity term.

4. The method of claim 1, wherein merging the optimized poses for the non-anchor poses from the plurality of blocks comprises:
    solving a pose graph problem that includes a regularity term of the non-anchor poses in the overlapping areas between the blocks.

5. The method of claim 4, wherein solving the pose graph problem that includes the regularity term of the non-anchor poses in the overlapping areas between the blocks comprises:
    minimizing a bundle adjustment equation updated with the regularity term.

6. The method of claim 1, wherein selecting one or more anchor poses from the plurality of initial poses comprises:

determining the one or more anchor poses based on metrics that comprise a number of visible GPS satellites used to calculate an inertial navigation system position velocity and altitude (INSPVA) corresponding to each of the plurality of initial poses.

7. The method of claim 1, further comprising:
iteratively separating the plurality of point clouds into a plurality of blocks;
identifying one or more frame pairs from the plurality of point clouds in each block;
identifying a plurality of pairs of points from the point clouds of the frame pairs;
optimizing the non-anchor poses with reference to the anchor poses that are fixed in each block to generate optimized poses for the non-anchor poses by constraining differences between previously optimized poses and currently optimized poses of the non-anchor poses; and
merging the currently optimized poses for the non-anchor poses from the plurality of blocks by constraining differences between the previously optimized poses and the currently optimized poses of the non-anchor poses in overlapping areas between the blocks.

8. The method of claim 1, wherein merging the optimized poses for the non-anchor poses from the plurality of blocks by constraining differences between the initial poses and the optimized poses of the non-anchor poses in overlapping areas between the blocks comprises minimizing a cost function using the alternating direction method of multipliers (ADMM) algorithm.

9. The method of claim 1, further comprising receiving the plurality of initial poses and the plurality of point clouds from a light detection and range (LIDAR) sensor.

10. A non-transitory machine-readable medium having instructions stored therein, which when executed by a processor, cause the processor to perform operations to register points clouds for an autonomous driving vehicles (ADV), the operations comprising:
selecting one or more anchor poses from a plurality of initial poses associated with a plurality of point clouds of a region having a plurality of blocks to be mapped;
identifying one or more frame pairs from the plurality of point clouds in each block, each of the frame pairs including one of the anchor poses and one of a plurality of non-anchor poses;
optimizing the non-anchor poses with reference to the anchor poses that are fixed in each block to generate optimized poses for the non-anchor poses based on a plurality of pairs of points between each of the frame pairs by constraining differences between the initial poses and the optimized poses of the non-anchor poses; and
merging the optimized poses to generate a plurality of optimized poses for the point clouds of the region in overlapping areas between the blocks.

11. The non-transitory machine-readable medium of claim 10, wherein optimizing the non-anchor poses with reference to the anchor poses that are fixed in each block comprises:
solving an iterative closest point (ICP) algorithm that includes a regularity term of the non-anchor poses in each block to generate the optimized poses for the non-anchor poses.

12. The non-transitory machine-readable medium of claim 11, wherein the regularity term of the non-anchor poses comprises differences between the initial poses and the optimized poses of the non-anchor poses and wherein solving the ICP algorithm that includes the regularity term of the non-anchor poses in each block to generate the optimized poses for the non-anchor poses comprises:
minimizing a bundle adjustment equation updated with the regularity term.

13. The non-transitory machine-readable medium of claim 10, wherein merging the optimized poses for the non-anchor poses from the plurality of blocks comprises:
solving a pose graph problem that includes a regularity term of the non-anchor poses in the overlapping areas between the blocks.

14. The non-transitory machine-readable medium of claim 13, wherein solving the pose graph problem that includes the regularity term of the non-anchor poses in the overlapping areas between the blocks comprises:
minimizing a bundle adjustment equation updated with the regularity term.

15. The non-transitory machine-readable medium of claim 10, wherein selecting one or more anchor poses from the plurality of initial poses comprises:
determining the one or more anchor poses based on metrics that comprise a number of visible GPS satellites used to calculate an inertial navigation system position velocity and altitude (INSPVA) corresponding to each of the plurality of initial poses.

16. A data processing system, comprising:
a processor; and
a memory coupled to the processor to store instructions, which when executed by the processor, cause the processor to perform operations to register point clouds for an autonomous driving vehicles (ADV), the operations including:
selecting one or more anchor poses from a plurality of initial poses associated with a plurality of point clouds of a region having a plurality of blocks to be mapped,
identifying one or more frame pairs from the plurality of point clouds in each block, each of the frame pairs including one of the anchor poses and one of a plurality of non-anchor poses,
optimizing the non-anchor poses with reference to the anchor poses that are fixed in each block to generate optimized poses for the non-anchor poses based on a plurality of pairs of points between each of the frame pairs by constraining differences between the initial poses and the optimized poses of the non-anchor poses, and
merging the optimized poses to generate a plurality of optimized poses for the point clouds of the region in overlapping areas between the blocks.

17. The data processing system of claim 16, wherein the operations for optimizing the non-anchor poses with reference to the anchor poses that are fixed in each block comprises:
solving an iterative closest point (ICP) algorithm that includes a regularity term of the non-anchor poses in each block to generate the optimized poses for the non-anchor poses.

18. The data processing system of claim 17, wherein the regularity term of the non-anchor poses comprises differences between the initial poses and the optimized poses of the non-anchor poses and wherein the operations for solving the ICP algorithm that includes the regularity term of the non-anchor poses in each block to generate the optimized poses for the non-anchor poses comprises:
minimizing a bundle adjustment equation updated with the regularity term.

19. The data processing system of claim 16, wherein the operations for merging the optimized poses for the non-anchor poses from the plurality of blocks comprises:
   solving a pose graph problem that includes a regularity term of the non-anchor poses in the overlapping areas between the blocks.

20. The data processing system of claim 19, wherein the operations for solving the pose graph problem that includes the regularity term of the non-anchor poses in the overlapping areas between the blocks comprises:
   minimizing a bundle adjustment equation updated with the regularity term.

* * * * *